Oct. 6, 1959  R. J. BRONIKOWSKI  2,907,992
MOUNTING MEANS FOR TEMPERATURE INDICATING DEVICE
Filed April 29, 1957

INVENTOR.
RAYMOND J. BRONIKOWSKI

BY

ATTORNEY

United States Patent Office 2,907,992
Patented Oct. 6, 1959

2,907,992

MOUNTING MEANS FOR TEMPERATURE INDICATING DEVICE

Raymond J. Bronikowski, South Milwaukee, Wis., assignor to McGraw-Edison Company, Milwaukee, Wis., a corporation of Delaware Application April 29, 1957, Serial No. 655,752

3 Claims. (Cl. 340—227)

The present invention relates generally to a temperature indicating device adapted for mounting upon the external surface of a tank-wall of a container to indicate attainment of certain predetermined temperatures, and more particularly, the present invention relates to an improved means for mounting the indicating device relative to the said tank-wall surface.

The present invention is particularly adapted for use with a temperature indicating device of the nature of the device disclosed in Patent No. 2,686,908 granted to Roald H. Amundson et al. on August 17, 1954, and assigned to the same assignee as is the present invention. However, the present mounting means is equally adaptable for use in connection with other conventional tank-wall temperature indicating devices.

It will be apparent that in the case of factory assembled equipment, accessories, such as temperature indicating devices for transformers and the like, may be mounted directly to the tank-wall by means of conventional bolt-washer-nut assemblies including gaskets for leakproof sealing, or the unit may be mounted directly to brackets welded to the tank-wall. However, since the provision of tank-wall temperature indicating devices is relatively recent, there are a substantial number of transformers and like equipment which have been installed without them, and are in daily use. It will be obvious that the conventional securing means used in factory assembly may not be applicable for installation in the field. There have been some attempts for mounting devices of this nature on previously installed transformers by means of wrapping a spring-loaded wire around the periphery of the tank and by other means, all of which have proven relatively unsatisfactory from both an appearance and a functional standpoint.

It must be appreciated that in the conventional distribution transformer, there is present a constant vibration tending to permit wrap-around retaining bands to slip downwardly unless they are clamped very tightly to the device. Inasmuch as these devices are quite often equipped with plastic housings, there is a tendency for an overtight securement to crack the housing and expose the operating elements to inclement weather.

It is, therefore, a principal object of the present invention to provide a means having particular adaptation for securing a temperature-indicating device directly to the tank-wall of a transformer or other device in the field or elsewhere rather than during original manufacturing assembly.

It is another object of the present invention to provide a mounting means for a temperature-indicating device arranged for mounting directly to a container having a tank-wall surface of magnetic material, wherein said mounting means is in the form of a permanent magnet secured to the temperature indicating device and arranged for magnetic attraction to the tank-wall surface.

It is still another object of the present invention to provide a magnetic mounting means for a temperature-indicating device operating in combination with a resilient pad spaced therefrom and which is arranged for frictional contact with a container tank-wall upon which the device is mounted and which further acts to insure intimate contact of the thermal actuator of the device and the tank-wall.

A further object of the present invention is to provide a magnetic mounting means for a tank-wall temperature indicating device, wherein said means is secured to said device by means of spring-loaded rivets biased towards relative engagement of said device and mounting means.

A still further object of the present invention is to provide a magnetic mounting means for attachment of a temperature indicating device directly to a container tank-wall, wherein the mounting means includes a permanent magnet secured directly to a non-magnetic spacer member, which acts to space the magnet from a magnetic keeper member, wherein the non-magnetic member provides the equivalent of an air gap to the magnetic flux normally flowing through a circuit established by the said magnet and a said magnetic member, and further wherein said gap provides a path of relatively higher reluctance for said magnetic flux than the path provided by the magnet when attached directly to a magnetic tank-wall surface.

Referring now to the drawing.

Figures 1, 2:
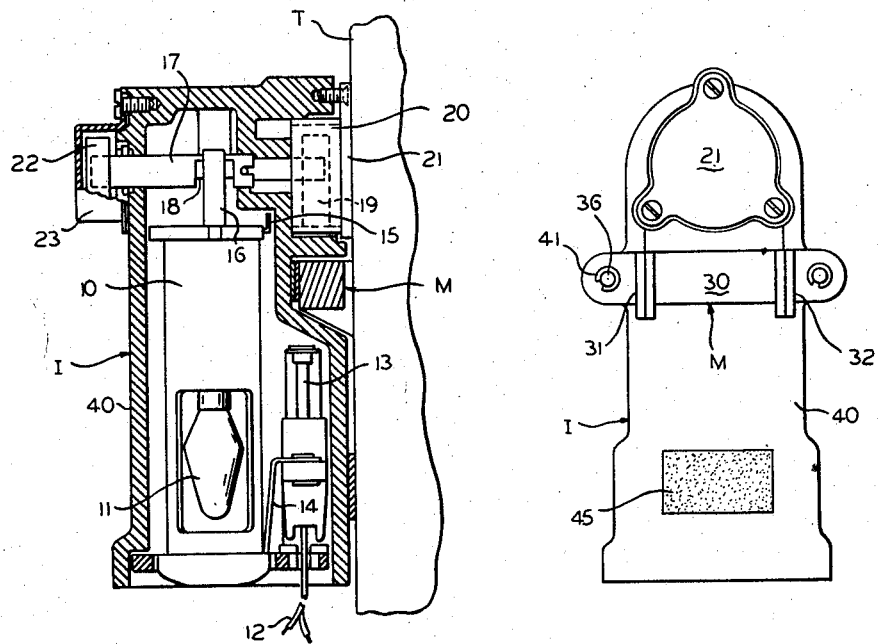
Fig. 1 is a side elevational view, partially in longitudinal section, of a temperature indicating device mounted adjacent a container tank-wall in accordance with the practice of the present invention.
Fig. 2 is a longitudinal rear view of the temperature indicating device illustrating, in detail, the mounting means of the present invention.

In the drawing, the thermally controlled temperature indicating device is generally denoted by the reference character I, and is intended for mounting externally of a container tank-wall surface T. It is conventional practice to use such devices in connection with transformers, regulators and like devices which are subject to overheating, and where such condition may occur, a visible and/or audible signal is desired.

The indicating device I, as previously mentioned, is fully illustrated and disclosed in the aforementioned Amundson et al. patent. Also, as previously mentioned, it is within the scope of the present invention to provide the preferred mounting means as an element of any of various conventional externally mounted temperature indicating or signalling devices (not shown). For present purposes, it will be apparent that the device I comprises a visible signal in the form of a downwardly biased indicator 10 which may, or may not, contain a signal lamp 11 arranged for connection with an electric supply source (not shown) by means of the leads 12 through the terminals of an expendible protective fuse 13 and the resilient engageable contact members 14 and 15, respectively.

The indicator 10, which may be gravity actuated, is normally suspended, as shown, by means of an L-shaped latch member 16 normally engaged with a drive shaft 17 at a point opposite an intermediate notched surface 18. A bimetallic actuator 19 is provided which is preferably spirally formed of a bimetallic material and engageable at its center with one end of the drive shaft 17. The outer end of the actuator is secured to a metallic heat conducting ring 20, which contacts, or may be integrally formed with a thermally conducting cover plate 21. The conducting cover plate 21 is arranged for direct heat-conducting engagement with the tank-wall T when the device I is mounted on the tank-wall surface, as shown in Fig. 1. Thus, the heat transmitted by the tank-wall will be conducted to the bimetallic actuator 19. An ambient temperature compensator 22 is provided at the opposite end of the drive shaft 17 in the form of a spirally wound bimetallic member attached to the cover cap 23 at one end thereof, and with its innermost end attached directly to the drive shaft 17.

Thus, when the tank-wall temperature reaches a predetermined level, the shaft 17 will be rotated by the bimetallic actuator 19 to permit the latch member 16 to clear the notched surface area 18. This will permit the indicator 10 to drop downwardly as a visible indication of the condition due to the forces of gravity or, if desired, by additional biasing spring means (not shown). In the embodiment illustrated, the indicator contact 15 will engage the contact 14 connected to the power supply leads 12 and the lamp 11 will be connected to provide a nighttime signal, if so desired.

The device may be easily reset by hand pressure at the bottom of the indicator 10 to force it upwardly to the position shown in the illustration of Fig. 1 to once again engage the drive shaft 17 which will have rotated to the position of Fig. 1 when the tank-wall T has been permitted to cool below the said predetermined temperature.

In particular, the present invention is directed to the means for mounting the indicating device I directly to the external surface of a container tank-wall T. The mounting means is generally denoted by the reference character M, and preferably comprises a bar magnet 30 terminating at opposite ends in soft iron pole pieces 31 and 32. Although the magnet 30 may be of any of many magnetic materials, it has been found preferable to provide the member of the alloy known as "Alnico 5," having fixed north-south poles at respective ends as designated in the view of Fig. 4. The pole pieces 31 and 32 are soldered or otherwise fastened to the magnet bar 30.

The entire assembly of magnet and pole pieces is soldered directly to a spacer member 33, which is preferably of brass or some other non-magnetic material. The spacer member 33 is also soldered directly to a mounting strap or keeper member 34 which is preferably of a magnetic material, such as steel. It is preferable to magnetize the magnet bar 30 after assembly with members 31—34.

Figures 3, 4:
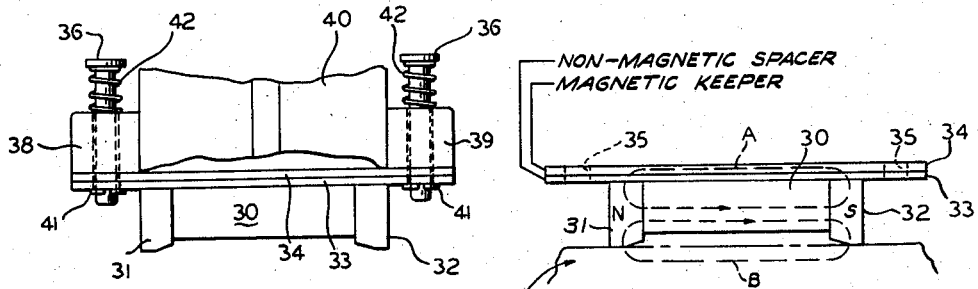
Fig. 3 is a fragmentary detail view of a portion of the temperature indicating device with the magnetic mounting means secured thereto.
Fig. 4 is a detail view of the magnetic mounting means indicating, in diagram, alternative flux path circuits through the device when mounted, and prior to mounting relative to a tank-wall.

The members 33 and 34 are apertured to slidably receive support pins 36, which are also slidably received by the apertured laterally extending opposed mounting ears 38 and 39 of the housing 40 of the device I. The pins 36 are preferably each provided with an annular groove to receive a C-shaped lock washer 41 at one end, and are also preferably headed at the opposite end to retain an helical compression spring 42 which normally biases the pin 36 in a direction towards withdrawal from the respective mounting ears 38 and 39; that is, upwardly, as viewed in Fig. 3. Thus, when assembled as shown in Fig. 3, the mounting means M is normally drawn towards the housing 40.

It is also preferable to provide a flexible frictional pad 45 placed below the mounting means M as viewed in Fig. 2. This pad provides resistance to downward creeping of the device due to vibration and, in addition, the resilient pad presses against the wall surface T to press the heat conducting plate 21 thereabove against the surface T with the magnet supports acting as a leverage fulcrum.

It will be apparent that the device I is readily adaptable for mounting directly adjacent any of well-known tank-wall surfaces enclosing transformers, regulators or any other equipment wherein a signal is desired to indicate overheating or other predetermined thermal condition affecting the enclosed instrumentality. As shown in Fig. 4, the magnet assembly is designed to provide two alternative flux paths A and B. The path A is a flux path normally flowing through the device M when it is not in mounting position relative to the magnetic surface T. That is, the path A follows a circuit through the magnet 30 to the pole piece 32 across the non-magnetic spacer member 33 to the magnetic keeper member 34 and therethrough to again cross the gap provided by the non-magnetic member to the pole piece 31 and again to the magnet 30.

However, when it is desired to mount the device I on a tank-wall surface T, it brought to a position in the proximity of the desired location on the surface T and the flux path of the mounting means will switch to the relative lower reluctance path B to travel from the magnet 30 through the pole piece 32 to the magnetic tank-wall surface T and thence to the pole piece 31 to the magnet 30. It will be apparent that this is the favored path as the thickness of the spacer member 33 has been chosen to be greater than the air gap that would ordinarily occur between pole pieces 31 and 32 and the surface T.

By providing the integral keeper 34 and spacer 35 the normal flux path A defined by the arrangement precludes the need for a conventional removable steel keeper plate on the magnet to prevent loss of strength when not in use or during shipment from manufacturer to the customer.

Inasmuch as the tank-wall surface may be irregular or that there may be a variation in tolerances between the housing 40 of the device I and the mounting strap 34 or the dimensions of the pole pieces 31 and 32, it has been found desirable to provide the spring loaded pins 36 for connection of the mounting means and to the housing 40. The compression spring 42 provides a means for biasing the pins 36 towards withdrawal from the apertured mounting ears 38 and 39, respectively. This insures that the mounting means M is held tightly against the housing 40 by a resilient mounting means in order that the thermally conducting cover plate 21 will always be flush with the tank-wall surface T as shown in Fig. 1.

Although from a practical standpoint the present embodiment of the mounting means is preferred, it is within the province of the present invention to provide a magnetic device which is jointly magnetically attracted to the magnetic tank-wall surface and to the indicating device (not shown) either by single or multiple magnets.

It is to be noted that throughout the present specification and claims the term "magnetic material" is a material that is magnetically attracted to a magnet, permanent or otherwise. The term "magnet" is used to indicate the source of the magnetic flux that attracts these materials.

I claim:

1. In a temperature indicating device arranged to signal a predetermined temperature condition affecting a container subject to substantial vibration and having a magnetic tank-wall surface including a thermally responsive actuator arranged to be positioned adjacent said surface and a signal member operatively associated with said actuator to be actuated to signal position on the occurrence of said predetermined temperature condition, the combination with a mounting means comprising a magnet secured to said device by means of spring-loaded mounting members being biased towards said device and arranged for magnetic attraction to said magnetic tank-wall surface and to conjointly secure said device to said tank-wall surface and to maintain said actuator in physical contact with said surface, and a resilient pad disposed in spaced relationship from said actuator, said magnet being positioned therebetween, said magnet and resilient pad preventing movement of said indicating device on said tank wall when the latter is vibrating.

2. In a temperature indicating device arranged to signal a predetermined temperature condition affecting a container subject to substantial vibration and having a magnetic tank-wall surface including a thermally responsive actuator arranged to be positioned adjacent said surface and a signal member operatively associated with said actuator to be actuated to signal position on the occurrence of said predetermined temperature condition, the combination with a mounting means comprising a magnet secured to said device and arranged to be magnetically attracted to said magnetic tank-wall surface and to conjointly maintain said actuator in physical contact with said surface, said magnet including an integral keeper of magnetic material and a non-magnetic spacer interposed therebetween, and a resilient pad disposed in spaced relationship from said actuator, said magnet being position therebetween, said magnet and resilient pad preventing movement of said indicating device on said tank wall when the latter is vibrating.

3. In a temperature indicating device arranged to signal a predetermined temperature condition affecting a container subject to substantial vibration and having a magnetic tank-wall surface including a thermally responsive actuator arranged to be positioned adjacent said surface and a signal member operatively associated with said actuator to be actuated to signal position on the occurrence of said predetermined temperature condition, the combination with a mounting means comprising a magnet secured to said device by means of spring-loaded mounting members being biased towards said device and arranged for magnetic attraction to said magnetic tank-wall surface and to conjointly secure said device to said tank-wall surface and to maintain said actuator in physical contact with said surface, said magnet including an integral keeper of magnetic material and a non-magnetic spacer interposed therebetween, and a resilient pad disposed in spaced relationship from said actuator, said magnet being positioned therebetween, said magnet and resilient pad preventing movement of said indicating device on said tank wall when the latter is vibrating.

References Cited in the file of this patent

UNITED STATES PATENTS

| | | |
|---|---|---|
| 1,932,143 | Piercy | Oct. 24, 1933 |
| 2,240,035 | Catherall | Apr. 29, 1941 |
| 2,279,846 | Stapleton | Apr. 14, 1942 |
| 2,553,668 | Morello | May 22, 1951 |
| 2,580,099 | Jaeger | Dec. 25, 1951 |
| 2,686,908 | Amundson et al. | Apr. 17, 1954 |
| 2,812,965 | Horvay | Nov. 12, 1957 |